(12) United States Patent
Purcell et al.

(10) Patent No.: US 7,636,899 B2
(45) Date of Patent: Dec. 22, 2009

(54) MULTIPLE APPLICATION AND MULTIPLE MONITOR USER INTERFACE IMAGE FORMAT SELECTION SYSTEM FOR MEDICAL AND OTHER APPLICATIONS

(75) Inventors: Joseph David Purcell, Ann Arbor, MI (US); Chris O'Donnell, Ann Arbor, MI (US); Perumal Sivakumar, Ann Arbor, MI (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 299 days.

(21) Appl. No.: 11/419,321

(22) Filed: May 19, 2006

(65) Prior Publication Data

US 2007/0024645 A1 Feb. 1, 2007

Related U.S. Application Data

(60) Provisional application No. 60/698,589, filed on Jul. 12, 2005.

(51) Int. Cl.
*G06F 3/048* (2006.01)
*G06F 3/00* (2006.01)
*G09G 5/00* (2006.01)

(52) U.S. Cl. .................. 715/790; 345/634; 715/761; 715/781; 715/788; 715/798; 715/800; 715/804

(58) Field of Classification Search .......... 715/781, 715/778, 761, 788, 790, 798, 800, 804; 345/684, 345/634
See application file for complete search history.

(56) References Cited

U.S. PATENT DOCUMENTS

| | | | | |
|---|---|---|---|---|
| 5,111,103 A | | 5/1992 | DuBrucq | |
| 5,452,416 A | * | 9/1995 | Hilton et al. | 715/783 |
| 5,668,997 A | * | 9/1997 | Lynch-Freshner et al. | 719/329 |
| 5,819,055 A | * | 10/1998 | MacLean et al. | 715/798 |
| 5,838,318 A | * | 11/1998 | Porter et al. | 715/790 |
| 5,883,626 A | * | 3/1999 | Glaser et al. | 715/788 |
| 5,923,307 A | * | 7/1999 | Hogle, IV | 345/4 |
| 5,977,973 A | * | 11/1999 | Sobeski et al. | 715/798 |
| 6,008,809 A | * | 12/1999 | Brooks | 715/792 |

(Continued)

FOREIGN PATENT DOCUMENTS

WO   WO 2004036410 A1 *   4/2004

*Primary Examiner*—Joshua D Campbell
*Assistant Examiner*—Stephen Alvesteffer

(57) ABSTRACT

A screen sharing function enables a main executable application, which typically uses more than one monitor, to switch to single-monitor usage as necessary to allow a user to directly interact with other applications that the main executable application invokes. A system including multiple display monitors for displaying multiple user interface image windows associated with corresponding multiple executable applications employs an image format determination system. The image format determination system includes an input processor for receiving command data representing a command to initiate execution of a function of a second application and display of an associated second image window in response to user entry of a command via a first image window associated with a first application. An image format selection processor, in response to the received command data, automatically initiates reduction in size of the first image window to fit a screen of the multiple display monitors and to prevent mutual overlap of the reduced size first image window and the second image window. A display processor initiates generation of data representing the reduced size first image window and the second image window, for presentation on the multiple display monitors.

14 Claims, 3 Drawing Sheets

U.S. PATENT DOCUMENTS

| | | | |
|---|---|---|---|
| 6,018,340 A * | 1/2000 | Butler et al. | 715/764 |
| 6,122,000 A | 9/2000 | Yee et al. | |
| 6,509,911 B1 * | 1/2003 | Shimotono | 715/761 |
| 6,573,913 B1 * | 6/2003 | Butler et al. | 715/761 |
| 6,771,292 B2 * | 8/2004 | Sharp | 715/788 |
| 2002/0097322 A1 | 7/2002 | Monroe et al. | |
| 2002/0138512 A1 * | 9/2002 | Buresh et al. | 707/507 |
| 2002/0191028 A1 * | 12/2002 | Senechalle et al. | 345/800 |
| 2003/0107604 A1 * | 6/2003 | Ording | 345/788 |
| 2003/0137528 A1 * | 7/2003 | Wasserman et al. | 345/700 |
| 2003/0156188 A1 | 8/2003 | Abrams, Jr. | |
| 2004/0066408 A1 * | 4/2004 | Meyers et al. | 345/764 |
| 2004/0210847 A1 * | 10/2004 | Berson et al. | 715/788 |
| 2004/0263426 A1 | 12/2004 | Endo | |
| 2005/0190263 A1 | 9/2005 | Monroe et al. | |

* cited by examiner ns application of provisional appli-
cation Ser. No. 60/698,589 by C. O'Donnell et al. filed Jul. 12, 2005.

1. FIELD OF THE INVENTION

This invention concerns an image format determination system for determining image size and format in a system including one or more display monitors and one or more executable applications.

2. BACKGROUND OF THE INVENTION

When two related executable applications operate in a system including a workstation with multiple display monitors, the executable applications frequently employ display images that need to share display image area. A primary executable application, for example, may operate in a system including a workstation with multiple monitors and may intermittently invoke secondary executable applications. Such a secondary executable application may initiate generation of an image window in the foreground of a display image overlaying a primary executable application image window, in response to user interaction with the secondary application. When the user interacts with the primary application, it appears in the foreground overlaying a secondary application image window, thus obscuring it completely (or partially). A user needing to interact with the secondary application again, performs an additional user interface action to bring the secondary image window forward again into the foreground (e.g., by using an ALT-TAB command, or via the Windows Taskbar, or by simply clicking on an un-obscured portion of the secondary application image window). This is a burdensome non-user friendly process. A system according to invention principles addresses the deficiencies of the existing process and related problems.

SUMMARY OF THE INVENTION

A user interface system ensures a primary executable application main image window displays on both monitors in a dual-monitor system and automatically switches between single and dual-monitor usage as necessary to permit other applications to operate concurrently with the primary application. A system including multiple display monitors for displaying multiple user interface image windows associated with corresponding multiple executable applications employs an image format determination system. The image format determination system includes an input processor for receiving command data representing a command to initiate execution of a function of a second application and display of an associated second image window in response to user entry of a command via a first image window associated with a first application. An image format selection processor, in response to the received command data, automatically initiates reduction in size of the first image window to fit a screen of the multiple display monitors and to prevent mutual overlap of the reduced size first image window and the second image window. A display processor initiates generation of data representing the reduced size first image window and the second image window, for presentation on the multiple display monitors.

DETAILED DESCRIPTION OF THE INVENTION

Figure 1:
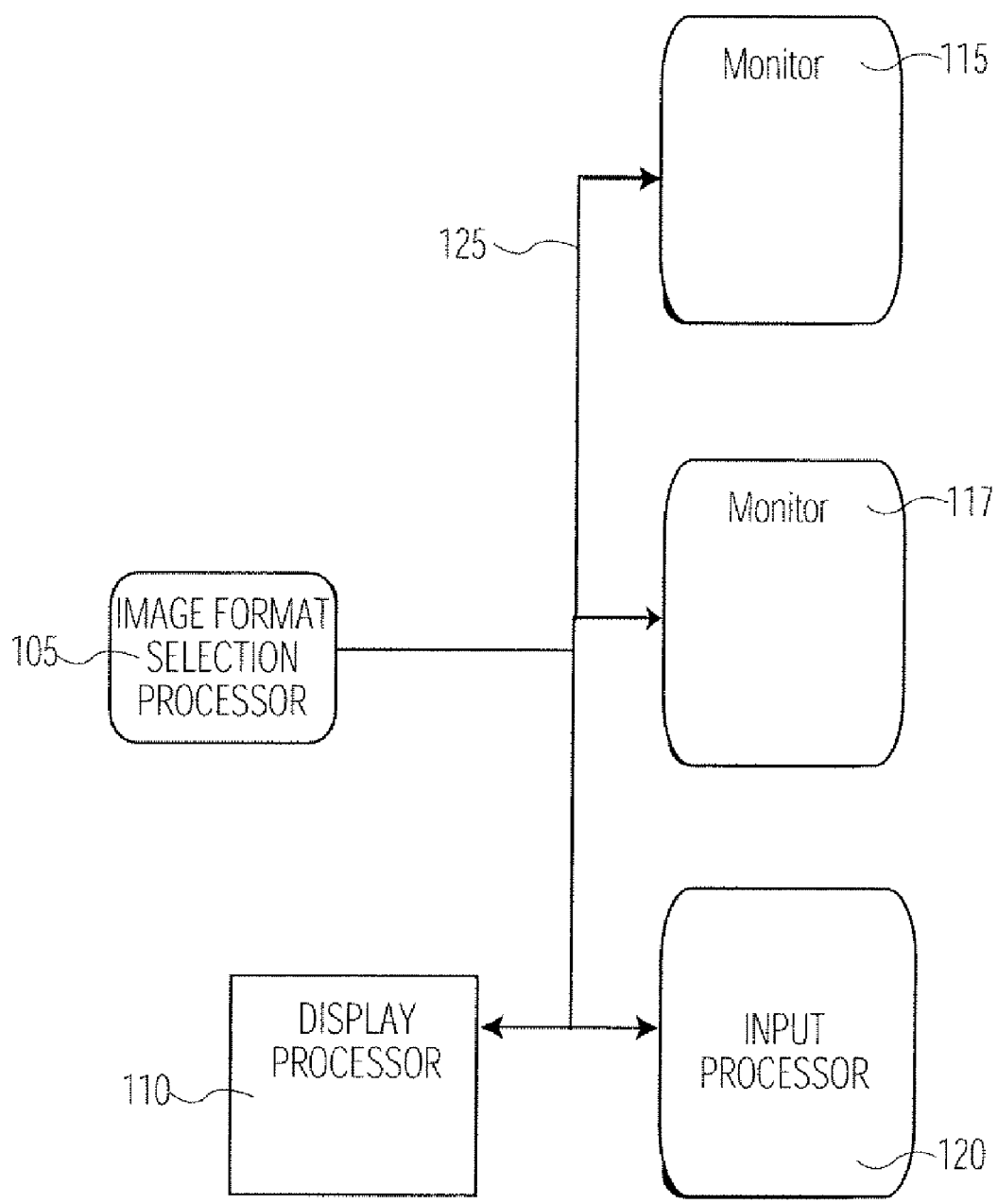
FIG. 1 shows an image format determination system, according to invention principles.

FIG. 1 shows an image format determination system including a screen sharing function that enables a main executable application, which typically uses more than one monitor, to switch to single-monitor usage as necessary to allow a user to directly interact with other applications that the main executable application invokes. The image format determination system ensures that a primary executable application knows when it is going to invoke a secondary executable application. A primary executable application, which operates, for example, in the coordinate space of two or more monitors, modifies a main image window to use the coordinate space of just one of the logical monitors. In response to a user closing a secondary executable application, the primary executable application switches back to multiple monitor usage (using predetermined data indicating the image coordinate space of available logical monitors).

A user is one that uses an executable application that invokes other executable applications in a multiple monitor system, for example. The image format determination system advantageously provides an improved user-interface and associated workflow (task sequences performed by personnel, devices or both) involving multiple executable applications. The system enables two applications, for example, that make use of screen sharing to require fewer user interface commands in order for a user to access both applications and both applications appear to run concurrently. Also, the image format determination system achieves these advantages without requiring that a primary application is integrated with a secondary application at the source-code level in order to achieve screen sharing. In an exemplary embodiment a primary application operates on two monitors and frequently invokes other secondary applications that process the same medical data. The image format determination system screen sharing function provides tighter integration between a primary application and other secondary applications, removing the need to directly integrate other secondary application source code with primary application code.

In an example of the image format determination system operation involving a medical image and clinical data, a physician reviews patient medical images on a dual-monitor system using a primary application and both monitors to display reports, worksheets, and the images. In response to a physician opening a NM. (Nuclear Medicine derived) image study on a left monitor, another secondary application is automatically initiated on a right monitor to manage display of NM images while a workstation switches to single-monitor usage. The physician is able to directly interact with both applications via corresponding image windows which are operating concurrently and displayed on left and right monitors respectively. Neither of the corresponding image windows of the two applications obscures the other, thus requiring none of the extra user interface processing steps which are necessary to bring obscured windows to the foreground. In response to termination of operation of the secondary application and closing of its corresponding image window, the workstation automatically switches to dual-monitor usage in which the image window of the primary application is displayed using both monitors.

In existing known systems, it is typical practice for a full-screen, multiple monitor primary application using multiple monitors to display a single image window to initiate a secondary application. In such an existing known system, if a user needs to interact with a different image window associated with both applications, the user explicitly switches between the two image windows using known command methods including, an ALT-TAB command, a Taskbar command, etc. In contrast, the image format determination system screen sharing approach, according to invention principles, provides improved integration between the two applications, as well as improved user interface workflow. The system provides improved user interface integration between two related applications on a multiple monitor system, without the need to integrate the source code of both applications into one binary file, for example.

The image format determination system ensures a software primary application provides a main image window, which displays on both monitors in a dual-monitor system and automatically switches between single and dual monitor usage as necessary to permit other applications to run concurrently with the primary application. Since the primary application window is a top-level image window (i.e., it is desirably concurrently visible with other image windows), it is advantageous for the system to temporarily switch to single-monitor usage to allow another secondary application to run, visibly, on the second monitor without obscuring a primary application image window.

FIG. 1 shows image format determination system 100 employed by a workstation (e.g., a PC, server, notebook, PDA) employing a microprocessor, controller or other processing device. System 100 employs a screen sharing function and multiple display monitors 115, 117 for displaying multiple user interface image windows associated with corresponding multiple executable applications. Input processor 120 receives command data representing a command to initiate execution of a function of a second application and display of an associated second image window in response to user entry of a command via a first image window associated with a first application. The user enters the command using a keyboard, a mouse, a touch screen, a microphone or a voice recognition application, for example. Image format selection processor 105, in response to the received command data, automatically initiates reduction in size of the first image window to fit a screen of display monitors 115 and 117 and to prevent mutual overlap of the reduced size first image window and the second image window. Display processor 110 initiates generation of data representing the reduced size first image window and the second image window, for presentation on display monitors 115 and 117.

System 100 and/or elements contained therein also may be implemented in a centralized or decentralized configuration. The system 100 may be implemented as a client-server, web-based, or stand-alone configuration. Elements of system 100 communicate via path 125 (otherwise called network, bus, link, connection, channel, etc.) that represents any type of protocol or data format. The protocol or data format includes, but is not limited to, one or more of the following: an Internet Protocol (IP), a Transmission Control Protocol Internet protocol (TCPIP), a Hyper Text Transmission Protocol (HTTP), an RS232 protocol, an Ethernet protocol, a Medical Interface Bus (MIB) compatible protocol, a Local Area Network (LAN) protocol, a Wide Area Network (WAN) protocol, a Campus Area Network (CAN) protocol, a Metropolitan Area Network (MAN) protocol, a Home Area Network (HAN) protocol, an Institute Of Electrical And Electronic Engineers (IEEE) bus compatible protocol, a Digital and Imaging Communications (DICOM) protocol, and a Health Level Seven (HL7) protocol.

An executable application as used herein comprises code or machine readable instruction for implementing predetermined functions including those of an operating system, healthcare information system or other information processing system, for example, in response user command or input. An executable procedure is a segment of code (machine readable instruction), sub-routine, or other distinct section of code or portion of an executable application for performing one or more particular processes and may include performing operations on received input parameters (or in response to received input parameters) and provide resulting output parameters. A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. A display processor or generator is a known element comprising electronic circuitry or software or a combination of both for generating data representing display images or portions thereof. A user interface comprises one or more display images enabling user interaction with a processor or other device.

Figure 2:
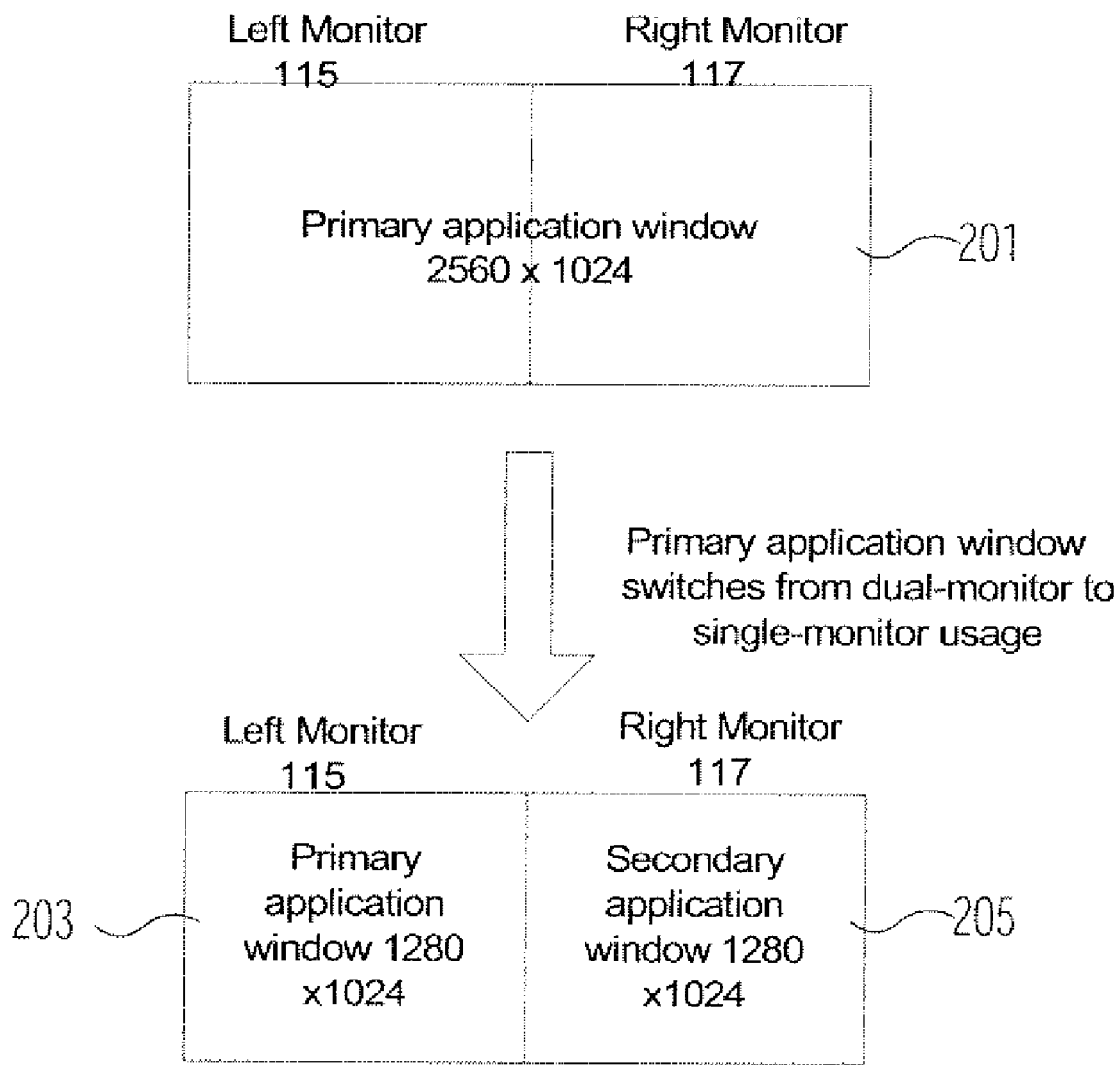
FIG. 2 illustrates image format determination system operation, according to invention principles.

FIG. 2 illustrates image format determination system operation. The primary application typically runs with a single full-size image window spanning both monitors 115 and 117 of the system 100 dual-monitor system. As a top-level image window, it obscures image windows of a desktop application and any other executing applications. In order to permit another application to execute concurrently and display an image window adjacent to an image window of the primary application, system 100 dynamically changes the primary application image window size to match that of a left monitor (monitor 115). System 100 initiates execution of a secondary application that displays an associated image window on the right monitor (monitor 117). Thereby image windows associated with primary and secondary applications are adjacent and displayed on monitors 115 and 117 respectively, enabling a user to interact with both applications without causing either window to obscure the other. In system 100, a software application whose main window, which runs full-size on two monitors, automatically dynamically changes size to accommodate other applications to use screen real estate in a seamless fashion. FIG. 2 illustrates that system 100 dynamically changes size of a 2560 by 1024 pixel image window 201 of a primary application spanning both display screens of monitors 115 and 117 to a 1280 by 1024 pixel image window 203 for display on left monitor 115. System 100 initiates display of a 1280 by 1024 pixel image window 205 of a secondary application on right monitor 117. System 100 initiates the dynamic re-sizing in response to detection of a command to initiate execution of a secondary application or to initiate display of an image window associated with a secondary application. The specific resolution image windows described herein are exemplary only. System 100 works with any image resolution.

The system 100 may be employed by a workstation in display of medical images, and series of medical images comprising still images or as video clips. System 100 may be used, for example, in imaging modality devices including, MRI, CT scan, X-ray, Ultrasound and Nuclear medicine imaging used by a healthcare provider. Such a healthcare provider may include a hospital, a critical care facility, a health care clinic, an imaging or radiology practice. System 100 may be fixed and/or mobile (i.e., portable). The system 100 may be implemented in a variety of forms including, but not limited to, one or more of the following: a personal computer (PC), a desktop computer, a laptop computer, a workstation, a minicomputer, a mainframe, a supercomputer, a network-based device, a personal digital assistant (PDA), a cellular telephone, a pager, and a wristwatch.

Figure 3:
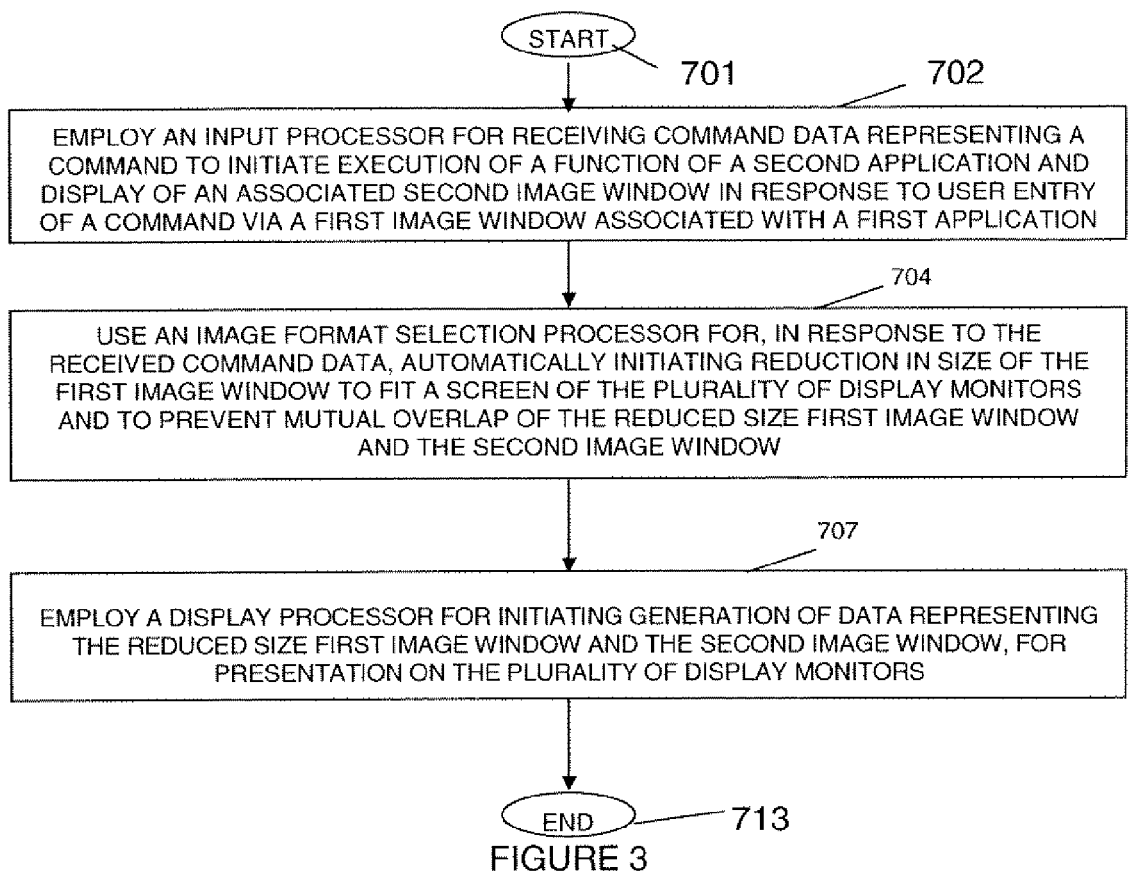
FIG. 3 shows a flowchart of a process used by an image format determination system, according to invention principles.

FIG. 3 shows a flowchart of a process used by an image format determination system (system 100 of FIG. 1). In step 702 following the start at step 701, input processor 120 in system 100 receives command data representing a command to initiate execution of a function of a second application and display of an associated second image window in response to user entry of a command via a first image window associated with a first application. The function of the second application comprises at least one of, initiation of execution of the second application and initiation of display or access to the second image window. In one embodiment, the first image window encompasses multiple display screens of the plurality of monitors (e.g., first and second display screens of respective first and second monitors). In another embodiment, the first image window comprises a first size image on a first display monitor.

In step 704, image format selection processor 105 in system 100, in response to the received command data, automatically initiates reduction in size of the first image window to fit a screen of the plurality of display monitors and to prevent mutual overlap of the reduced size first image window and the second image window. In one embodiment, the first image window comprises a reduced size version of the first size image on the first display monitor of the plurality of display monitors to prevent mutual overlap of the reduced size first image window and the second image window on the first display monitor. In another embodiment, the first image window comprises a reduced size version of the first size image on a first display monitor and the second image window is displayed on a screen of a second monitor of the plurality of display monitors to prevent mutual overlap of the reduced size first image window and the second image window. The image format selection processor, in response to the received command data, automatically initiates reduction in at least one of, (a) horizontal number of image pixels and (b) vertical number of image pixels, of the first image window to fit a screen of the plurality of display monitors.

Display processor 110 in system 100 in one embodiment in step 707, initiates generation of data representing the first image window comprising a reduced size version of the first size image on the first display monitor of the plurality of display monitors to prevent mutual overlap of the reduced size first image window and the second image window on the first display monitor. In another embodiment display processor 110 in system 100 initiates generation of data representing the reduced size first image window and the second image window, for presentation on the plurality of display monitors. The reduced size first image window is presented on a first monitor of the plurality of display monitors and the second image window is presented on a different second monitor of the plurality of display monitors. The first image window prior to the size reduction encompasses the first monitor and the different second monitor. In response to a user command to terminate execution of the second application or a function of the second application, the image format selection processor automatically initiates increase in size of the first image window to fit a screen of a monitor of the plurality of display monitors. In another embodiment, in response to a user command to terminate execution of the second application or a function of the second application, the image format selection processor automatically initiates increase in size of the first image window to encompass display screens of the first monitor and the different second monitor. The process of FIG. 3 ends at step 713.

The systems and processes presented in FIGS. 1-3 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system according to invention principles is usable wherever multiple concurrent applications employing corresponding multiple image windows are to be displayed on a user interface employing one or more display monitors. Further, any of the functions provided by the systems and processes of FIGS 1-3 may be implemented in hardware, software or a combination of both and may reside on one or more processing devices located at any location of a network linking the FIG. 1 elements.

What is claimed is:

1. An image formatting system for displaying a plurality of user interface image windows associated with a corresponding plurality of executable applications comprising:

a plurality of display monitors comprising at least a first monitor and a different second monitor wherein a first image window associated with a primary application encompasses at least said first monitor and said different second monitor, said primary application enabling initiation of a secondary application and the first image window associated with said primary application being designated in predetermined data as a top-level image window to remain concurrently visible upon display of a second image window associated with said secondary application;

an input processor for receiving command data representing a command to initiate execution of a function of said secondary application and display of an associated second image window, said first image window being exclusive of said second image window, in response to user entry of a command via said first image window;

an image format selection processor for automatically initiating reduction in size of said first image window to encompass said first monitor of said plurality of display monitors and to prevent mutual overlap of said reduced size first image window and said second image window encompassing said different second monitor of said plurality of display monitors, in response to user entry of said command; and a display processor for initiating generation of data representing said reduced size first image window and said second image window, for presentation on said first and different second monitors, respectively.

2. A system according to claim 1, wherein
said first image window encompasses a third monitor, different from said first monitor and said different second monitor.

3. A system according to claim 1, wherein
said image format selection processor automatically initiates increase in size of said first image window, in response to predetermined data indicating image coordinate space of available logical monitors, to encompass said at least first monitor and said different second monitor, prior to said size reduction, in response to a user command to terminate execution of said function of said secondary application.

4. A system according to claim 1, wherein
said function of said secondary application comprises at least one of, (a) initiation of execution of said secondary application and (b) initiation of display or access to said second image window.

5. A system according to claim 1, wherein
in response to a user command to terminate execution of said function of said secondary application, said image format selection processor automatically initiates increase in size of said first image window to encompass multiple monitors of said plurality of display monitors.

6. A system according to claim 5, wherein
said multiple monitors of said plurality of display monitors include said first monitor, said different second monitor and a third monitor.

7. A system according to claim 1, wherein
in response to a user command to terminate execution of said secondary application, said image format selection processor automatically initiates increase in size of said first image window to encompass multiple monitors of said plurality of display monitors.

8. A system according to claim 7, wherein
said multiple monitors of plurality of display monitors comprise a first monitor, said different second monitor and a third monitor.

9. A system according to claim 1, wherein
said image format selection processor, in response to said received command data, automatically initiates reduction in at least one of, (a) horizontal number of image pixels and (b) vertical number of image pixels, of said first image window to encompass said first monitor of said plurality of display monitors.

10. An image formatting system for displaying a plurality of user interface image windows associated with a corresponding plurality of executable applications comprising:
   a plurality of display monitors comprising at least a single first monitor and a different second monitor wherein a first image window associated with a primary application encompasses at least said single first monitor and said different second monitor, said primary application enabling initiation of a secondary application and the first image window associated with said primary application being designated in predetermined data as a top-level image window to remain concurrently visible upon display of a second image window associated with said secondary application;
   an input processor for receiving command data representing a command to initiate execution of a function of said secondary application and display of an associated second image window, said first image window being exclusive of said second image window, in response to user entry of a command via said first image window;
   an image format selection processor for automatically initiating reduction in size of said first image window to encompass said single first monitor of said plurality of display monitors and to prevent mutual overlap of said reduced size first image window and said second image window encompassing said different second monitor of said plurality of display monitors, in response to predetermined data indicating image space of available monitors and in response to user entry of said command; and
   a display processor for initiating generation of data representing said reduced size first image window for display on said single first monitor and data representing said second image window for display on a second different monitor, of said plurality of display monitors.

11. A system according to claim 10, wherein
said first image window encompasses a third monitor, different from said single first monitor and said different second monitor.

12. A system according to claim 10, wherein
in response to a user command to terminate execution of said function of said secondary application, said image format selection processor automatically initiates increase in size of said first image window to encompass said at least first monitor and said different second monitor, as prior to said size reduction.

13. A system according to claim 12, wherein
said image format selection processor automatically resizes and enlarges the reduced first image window to encompass said at least single first monitor and said different second monitor, as prior to said size reduction, upon command of closing of said secondary application.

14. A system according to claim 10, wherein
in response to a user command to terminate execution of said secondary application, said image format selection processor automatically initiates increase in size of said first image window to said at least first monitor and said different second monitor, as prior to said size reduction.

* * * * *